(12) United States Patent
Sasscer

(10) Patent No.: US 9,193,472 B2
(45) Date of Patent: Nov. 24, 2015

(54) ELECTROMECHANICAL ACTUATOR LUBRICATION SYSTEM FOR RAM AIR TURBINE

(75) Inventor: Gary Sasscer, Leaf River, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 673 days.

(21) Appl. No.: 13/490,039

(22) Filed: Jun. 6, 2012

(65) Prior Publication Data

US 2013/0327885 A1 Dec. 12, 2013

(51) Int. Cl.
*B64D 41/00* (2006.01)

(52) U.S. Cl.
CPC .................... *B64D 41/007* (2013.01)

(58) Field of Classification Search
CPC .................................................. B64D 41/007
USPC ..................... 92/51, 53, 86, 117 A
See application file for complete search history.

(56) References Cited

U.S. PATENT DOCUMENTS

| | | | | |
|---|---|---|---|---|
| 1,733,891 A | * | 10/1929 | Loudy | 290/55 |
| 2,977,071 A | * | 3/1961 | Plotkowiak et al. | 244/58 |
| 5,820,074 A | * | 10/1998 | Trommer et al. | 244/58 |
| 6,135,434 A | * | 10/2000 | Marking | 267/64.26 |
| 6,155,545 A | * | 12/2000 | Noro et al. | 267/221 |
| 7,374,028 B2 | * | 5/2008 | Fox | 188/322.14 |
| 8,070,094 B2 | | 12/2011 | Collins | |
| 8,123,161 B1 | | 2/2012 | Collins | |
| 2007/0144847 A1 | * | 6/2007 | Abe | 188/299.1 |
| 2009/0280015 A1 | | 11/2009 | Lillie et al. | |
| 2011/0203889 A1 | | 8/2011 | Eom | |
| 2012/0091272 A1 | | 4/2012 | Affre De Saint Rome | |

OTHER PUBLICATIONS

U.S. Appl. No. 13/167,801, filed Jun. 24, 2011, "Electromechanical Actuator Driven Governor for Ram Air Turbine".

* cited by examiner

*Primary Examiner* — Edward Look
*Assistant Examiner* — Michael Quandt
(74) *Attorney, Agent, or Firm* — Carlson, Gaskey & Olds, P.C.

(57) ABSTRACT

An actuator for a ram air turbine includes a housing that supports a piston rod arranged in a cylinder. The piston rod and the cylinder are slideably moveable relative to one another between retracted and deployed positions. A can surrounds the cylinder and is loosely fixed relative to the housing. The can is permitted to pivot relative to the housing and cylinder relative to the cylinder in a radial direction during operation. In operation, the ram air turbine is deployed by initiating a deploy sequence. The piston rod and the cylinder are extended relative to one another to the deployed position. The method includes pivoting a can that surrounds the cylinder and the piston rod.

15 Claims, 4 Drawing Sheets

ELECTROMECHANICAL ACTUATOR LUBRICATION SYSTEM FOR RAM AIR TURBINE

BACKGROUND

This disclosure relates to an electromechanical actuator lubrication system used for a ram air turbine (RAT), for example.

A typical hydraulic RAT actuator includes a piston rod movable relative to a cylinder. In one example actuator, the piston rod is affixed to a housing. The housing includes a long nose that is machined as part of the housing. The cylinder slides axially relative to the nose during deployment.

Historically, this nose has been designed such that no high pressure oil, generated during the damping motion of the actuator, escapes during the deployment of the RAT. A cavity is provided between the nose and the cylinder and housing. This cavity is typically filled with return pressure oil from the aircraft. Several recent aircraft designs employ check valves in the hydraulic system upstream of the RAT to prevent loss of hydraulic oil in the event of a catastrophic event. Therefore, when the actuator tries to draw fluid upon deployment it can create a vacuum in the system. This vacuum is eventually filled by leakage from other various flight control components.

The return pressure is typically relatively low, however, the pressure has increased significantly on recent aircraft designs. Only one dynamic seal maintains the oil-filled cavity, and there is a possibility that fluid might leak from the cavity, which is undesirable. Moreover, there is a chance that the cylinder may become misaligned relative to the nose since the nose is fixed relative to the cylinder, which could provide a leak path.

SUMMARY

An actuator for a ram air turbine includes a housing that supports a piston rod arranged in a cylinder. The piston rod and the cylinder are slideably moveable relative to one another between retracted and deployed positions. A can surrounds the cylinder and is loosely fixed relative to the housing. The can is permitted to pivot relative to the housing and cylinder relative to the cylinder in a radial direction during operation.

In operation, the ram air turbine is deployed by initiating a deploy sequence. The piston rod and the cylinder are extended relative to one another to the deployed position. The method includes pivoting a can that surrounds the cylinder and the piston rod.

BRIEF DESCRIPTION OF THE DRAWINGS

The disclosure can be further understood by reference to the following detailed description when considered in connection with the accompanying drawings wherein.

DETAILED DESCRIPTION

Figure 1:
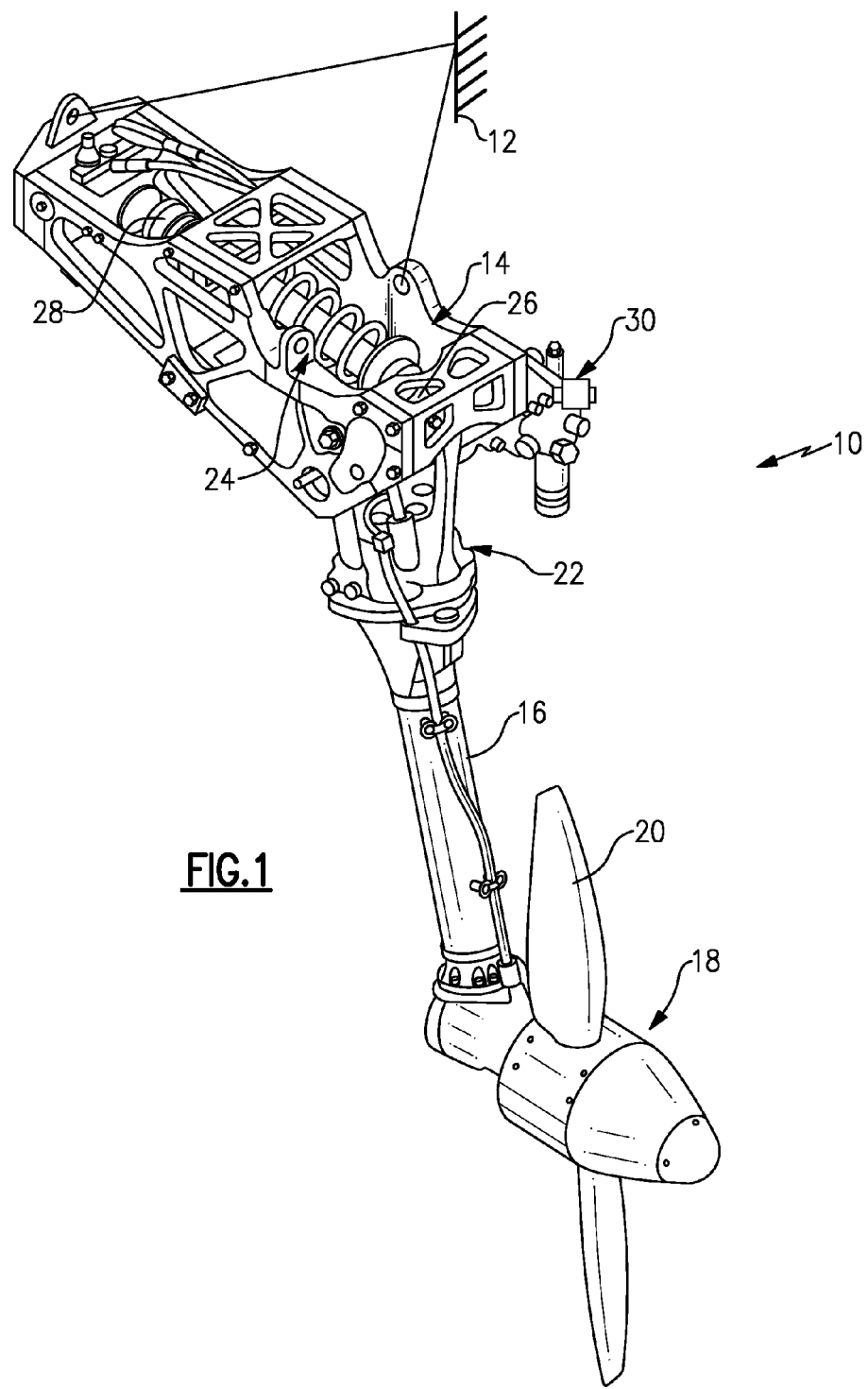
FIG. 1 is a perspective view of a RAT system in a deployed position.

FIG. 1 illustrates a RAT system 10 secured to an aircraft structure 12 by a housing 14. The housing 14 pivotally supports a strut 16 having a turbine 18 at one end. The turbine 18 includes blades 20, which impart rotational drive to a generator 22 and a hydraulic pump 30, for example. An actuator 24 is secured to the strut 16 at a first end 26 and to the housing at a second end 28. The actuator 24 is illustrated in its deployed position.

Figure 2:
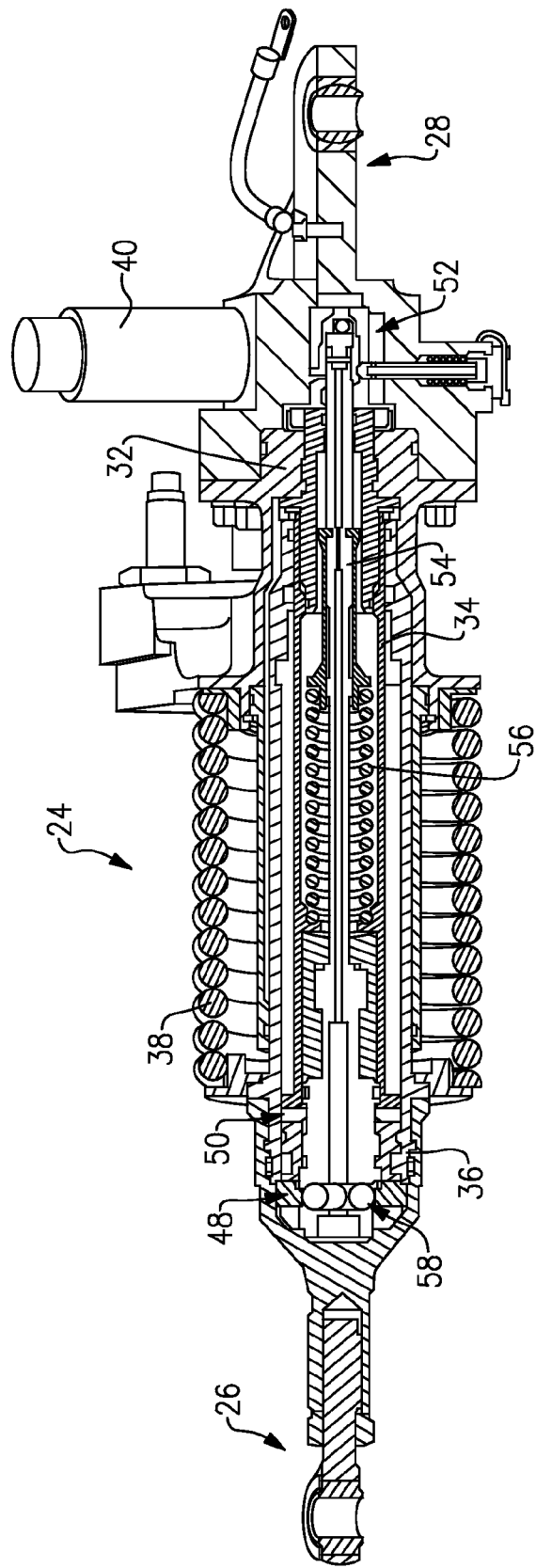
FIG. 2 is a cross-sectional view of an actuator illustrated in FIG. 2, but in a retracted position.
Figure 3:
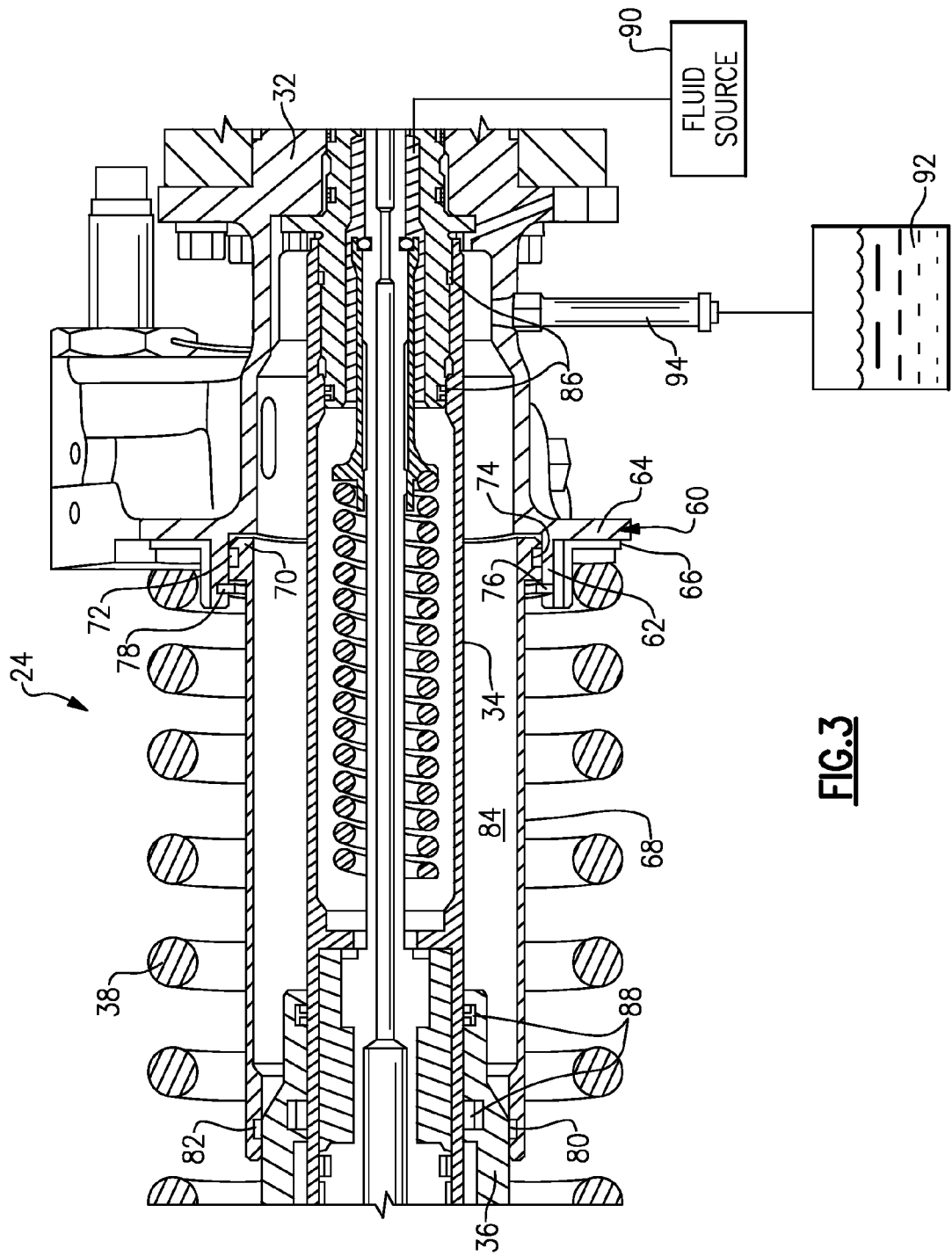
FIG. 3 is an enlarged view of a portion of the actuator with a can, as shown in FIG. 2, but in a deployed position.

Referring to FIGS. 2 and 3, the actuator 24 includes a housing 32 having a piston rod 34 and a cylinder 36, unattached to housing 32, telescopically arranged relative to one another. A deploy spring 38 is arranged between the housing 32 and the cylinder 36 in a compressed state with the actuator 24 in its retracted position, shown in FIG. 2. The piston rod 34 is affixed to the housing 32 and the cylinder 36 is arranged to slide over the piston rod 34.

The piston rod 34 supports up-lock and down-lock wedges 48, 50. A latch assembly 52 is provided in the housing 32 near a deploy solenoid 40 that is mounted on the housing 32. A lock bolt 54 is arranged slideably within the piston rod 34 to actuate up-lock and down-lock wedges 48, 50 during the deploy sequence. A roller assembly 58 is supported by the lock bolt 54 and arranged radially inward from the up-lock wedges 48.

The deploy solenoid 40 is actuated to initiate a deploy sequence within the actuator 24. In operation, to initiate the deploy sequence, the deploy solenoid 40 releases the latch assembly 52. The lock bolt 54 is forced to move axially to the right in FIG. 2 by a lock bolt spring 56 arranged between the piston rod 34 and the lock bolt 54. The roller assembly 58 permits the up-lock wedges 48 to move radially inward and disengage from the end of the cylinder 36. The deploy spring 38 is then able to urge the cylinder axially relative to and away from the housing 32 to the deployed position shown in FIGS. 1 and 3. The down-lock wedges 50 limits the axial travel of the cylinder 36 relative to the piston rod 34.

Referring to FIG. 3, the lubrication system for the actuator 24 is illustrated in more detail. The housing 32 includes a flange 60 provided by an axially extending annular wall 62 and a radially extending annular wall 64. A spring seat 66 is supported by the flange 60 and receives the deploy spring 38.

A discrete can 68 is mounted to the housing 32, replacing the integral nose in prior actuators. The can 68 is retained loosely in a manner that permits the can 68 to move relative to the housing 32 and the cylinder 36. The can 68 is held somewhat firmly in place by the seal 72. Machined clearances between the can 68 and the housing 32 and cylinder 36 permit the can 68 to pivot about the seal 72, maintaining its seal integrity, while allowing the seal 80 at the other end of the can 68 to maintain its symmetrical position about the cylinder 36. The non-rigid manner in which the can 68 is attached allows the can 68 freedom to compensate for non-perfect axial motion of the cylinder 36, maintaining concentricity about the sealing surface.

An annular band 70 is provided at one end of the can 68 and includes a groove 74 that receives a seal 72 that seals against the axially ending wall 62. A groove 76 is provided in the axially extending wall 62 and receives a retainer 78 that abuts against the annular band 70 to axially locate the can 68 relative to the housing 32. In one example, the retainer 78 is a spiral lock ring. A groove 80 is provided at the other end of the can 68 and receives a seal 82 that seals against an outer diameter of the cylinder 36.

A cavity 84 is provided interiorly of the can 68 between the can 68 and the piston rod 34 and cylinder 36. In one example, the cavity 84 is vented. A fluid source 90 provides pressurized fluid to the actuator 24, for example, to a chamber provided within the piston rod 34 and cylinder 36. In the example arrangement, seals 86 are provided between the piston rod 34 and the housing 32, and seals 88 are provided between the piston rod 34 and the cylinder 36. The seals 86, 88 and additional seals, if desired, maintain the pressurized fluid interiorly of the piston rod 34 and cylinder housing 36. During operation, the cavity 84 should remain dry. If fluid does enter the cavity 84, a line 94 fluidly connects the cavity 84 to a catch container 92, which collects the unpressurized fluid.

Figure 4:
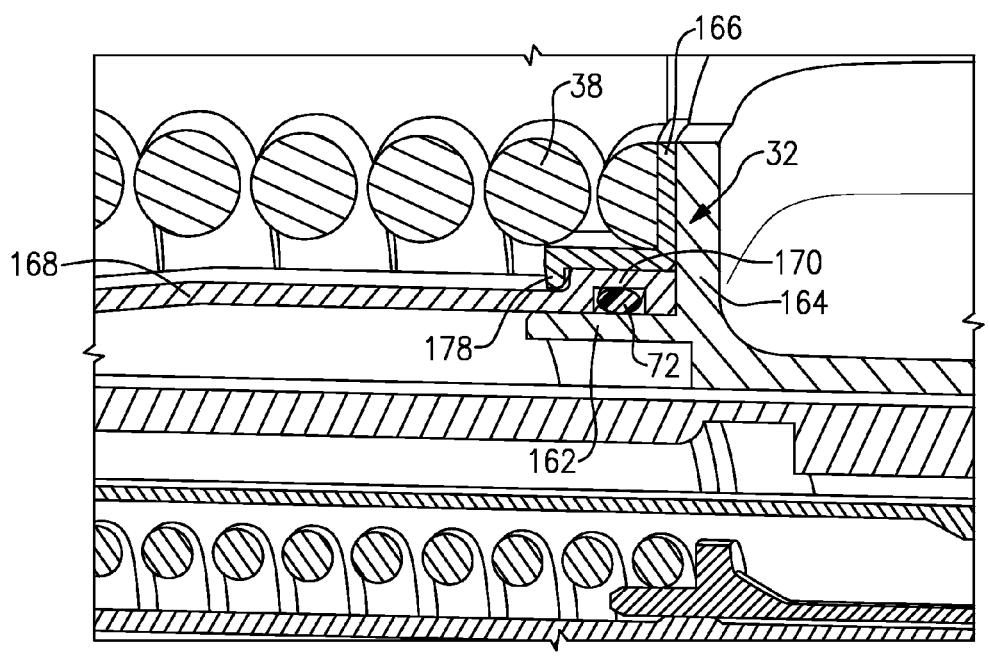
FIG. 4 is an enlarged view of another retention configuration for the can.

Another example can retention configuration is shown in FIG. 4. The annular band 170 of the can 168 is retained between the spring seat 166 and the housing 32. The seal 72 engages an outer diameter of the axially extending wall 162. The deploy spring 38 urges a retainer 178, which is integral with the spring seat 166, to bias the can 168 toward the radially extending wall 164.

The configuration draws less fluid from the aircraft upon deployment than previous designs which is a benefit to the aircraft manufacturer. Less make up fluid from the aircraft is required by the actuator as it extends. By requiring less fluid, less of a vacuum is created.

Although an example embodiment has been disclosed, a worker of ordinary skill in this art would recognize that certain modifications would come within the scope of the claims. For that reason, the following claims should be studied to determine their true scope and content.

What is claimed is:

1. An actuator for a ram air turbine comprising:
    a housing supporting a piston rod arranged in a cylinder, the piston rod and the cylinder slideably moveable relative to one another between retracted and deployed positions; and
    a can surrounds the cylinder and is loosely and non-rigidly supported relative to the housing, the can permitted to pivot relative to the housing and relative to the cylinder in a radial direction during operation.

2. The actuator according to claim 1, wherein the can supports first and second seals that are respectively sealed relative to the housing and the cylinder.

3. The actuator according to claim 2, wherein the housing includes a flange, and comprising a deploy spring engaging the flange and the cylinder and configured to bias the cylinder from the retracted position to the deployed position in response to an initiating sequence.

4. The actuator according to claim 2, comprising a retainer securing the can relative to the housing, and the first and second seals providing the pivot.

5. The actuator according to claim 1, comprising a pressurized fluid source fluidly connected to the cylinder and the piston rod.

6. The actuator according to claim 5, wherein a cavity is provided between the can and the cylinder and the piston rod, the cavity fluidly separated from the pressurized fluid source.

7. The actuator according to claim 6, comprising a catch container fluidly connected to the cavity and configured to collect unpressurized fluid from the cavity.

8. The actuator according to claim 1, wherein
    the can is mounted to the housing and surrounds the cylinder to provide a cavity, wherein the cavity is normally dry.

9. A method of deploying a ram air turbine comprising:
    initiating a deploy sequence;
    extending a piston rod and a cylinder relative to one another to a deployed position; and
    pivoting a can that surrounds the cylinder and the piston rod in a radial direction.

10. The method according to claim 9, wherein the extending step includes exposing the cylinder and the piston rod to pressurized fluid.

11. The method according to claim 10, comprising the step of venting a cavity between the can and the cylinder and the piston rod.

12. The method according to claim 11, wherein the pivoting step includes pivoting the can about a seal.

13. The method according to claim 11, wherein the venting step includes draining unpressurized fluid to a catch container.

14. A method of deploying a ram air turbine comprising:
    initiating a deploy sequence, wherein the initiating step includes unlatching a lock bolt;
    extending a piston rod and a cylinder relative to one another to a deployed position; and
    pivoting a can that surrounds the cylinder and the piston rod.

15. The method according to claim 14, wherein the initiating step includes urging the cylinder in axial direction from the housing with a deploy spring.

* * * * *